United States Patent
Tyagi et al.

(10) Patent No.: US 11,450,008 B1
(45) Date of Patent: Sep. 20, 2022

(54) SEGMENTATION USING ATTENTION-WEIGHTED LOSS AND DISCRIMINATIVE FEATURE LEARNING

(71) Applicant: Amazon Technologies, Inc., Seattle, WA (US)

(72) Inventors: Ambrish Tyagi, Sunnyvale, CA (US); Siddhartha Chandra, Santa Clara, CA (US); Amit Kumar Agrawal, Santa Clara, CA (US); Viveka Kulharia, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 238 days.

(21) Appl. No.: 16/803,363

(22) Filed: Feb. 27, 2020

(51) Int. Cl.
  *G06T 7/194* (2017.01)
  *G06N 3/04* (2006.01)
  *G06F 17/18* (2006.01)
  *G06F 17/16* (2006.01)
  *G06T 11/20* (2006.01)

(52) U.S. Cl.
  CPC ............. *G06T 7/194* (2017.01); *G06F 17/16* (2013.01); *G06F 17/18* (2013.01); *G06N 3/04* (2013.01); *G06T 11/20* (2013.01); *G06T 2207/20072* (2013.01); *G06T 2207/20081* (2013.01); *G06T 2207/20084* (2013.01); *G06T 2210/12* (2013.01)

(58) Field of Classification Search
  CPC ........... G06T 11/20; G06T 7/194; G06N 3/04; G06F 17/18; G06F 17/16
  See application file for complete search history.

(56) References Cited

U.S. PATENT DOCUMENTS

| | | | |
|---|---|---|---|
| 9,917,988 B2* | 3/2018 | Fang | H04N 19/553 |
| 10,007,865 B1* | 6/2018 | Kim | G06K 9/623 |
| 10,091,386 B2* | 10/2018 | Yang | H04N 1/00246 |
| 10,169,679 B1* | 1/2019 | Kim | G06V 10/22 |
| 10,275,867 B1* | 4/2019 | Pathapati | G06T 7/0002 |
| 10,438,082 B1* | 10/2019 | Kim | G06N 3/084 |
| 10,571,454 B2* | 2/2020 | Narasimhan | G01N 33/46 |
| 10,635,927 B2* | 4/2020 | Chen | G06N 3/0454 |
| 10,860,836 B1* | 12/2020 | Tyagi | G06K 9/627 |
| 10,872,276 B2* | 12/2020 | Han | G06V 30/194 |
| 10,909,349 B1* | 2/2021 | Tripathi | G06V 10/25 |
| 10,929,977 B2* | 2/2021 | Wang | G06T 7/10 |
| 2017/0147905 A1* | 5/2017 | Huang | G06K 9/6257 |
| 2018/0032840 A1* | 2/2018 | Yu | G06K 9/6267 |
| 2018/0174046 A1* | 6/2018 | Xiao | G06V 40/10 |

(Continued)

*Primary Examiner* — Mia M Thomas
(74) *Attorney, Agent, or Firm* — K&L Gates LLP

(57) ABSTRACT

Devices and techniques are generally described for weakly-supervised object segmentation in image data. In various examples, a first frame of image data may be received. The first frame may include a first bounding box surrounding a first set of pixels, wherein first subset of pixels of the first set of pixels represent a first object of a first class and wherein second subset of pixels of the first set of pixels represent background image data. Cross-entropy loss may be determined for the first set of pixels. In some examples, a spatial attention map may be determined for the first set of pixels. In further examples, parameters of a convolutional neural network may be determined by modulating the cross-entropy loss for the first set of pixels using the spatial attention map. The convolutional neural network may be used to generate a segmentation map.

20 Claims, 6 Drawing Sheets

(56) References Cited

U.S. PATENT DOCUMENTS

| | | | |
|---|---|---|---|
| 2018/0260651 A1* | 9/2018 | Wang | G06K 9/3241 |
| 2018/0268220 A1* | 9/2018 | Lee | G06K 9/4642 |
| 2019/0370965 A1* | 12/2019 | Lay | G06N 20/00 |
| 2020/0019860 A1* | 1/2020 | Konieczny | G06N 3/08 |
| 2020/0082198 A1* | 3/2020 | Yao | G06K 9/00986 |
| 2020/0210721 A1* | 7/2020 | Goel | G06N 3/04 |
| 2020/0211185 A1* | 7/2020 | Hu | G06K 9/6267 |
| 2020/0250492 A1* | 8/2020 | Kim | G06K 9/627 |
| 2021/0027098 A1* | 1/2021 | Ge | G06K 9/6262 |
| 2021/0241107 A1* | 8/2021 | Jie | G06T 7/11 |
| 2022/0044352 A1* | 2/2022 | Liao | G06T 3/0012 |
| 2022/0083789 A1* | 3/2022 | Zhou | G06T 7/50 |

\* cited by examiner

US 11,450,008 B1

SEGMENTATION USING ATTENTION-WEIGHTED LOSS AND DISCRIMINATIVE FEATURE LEARNING

BACKGROUND

Segmentation of image data includes separation of pixels determined to be part of the foreground environment from pixels determined to be part of the background environment. For example, a person standing in the foreground of an image may be segmented from the background environment or an article of clothing being held may be segmented from the person holding the article using segmentation techniques. Segmentation techniques may generate segmentation masks that denote whether each pixel of an image is a part of the "foreground" or the "background." Additionally, objects labeled as foreground may be labeled as being of a particular object category (e.g., "cat," "dog," "car," "background," etc.). In some examples, convolutional neural networks and/or other machine learning models can be used to classify types and/or classes of objects. For example, a convolutional neural network may be used to detect and classify objects present in segmented foreground image data and/or background image data corresponding to a class for which the convolutional neural network has been trained.

DETAILED DESCRIPTION

Figure 1:
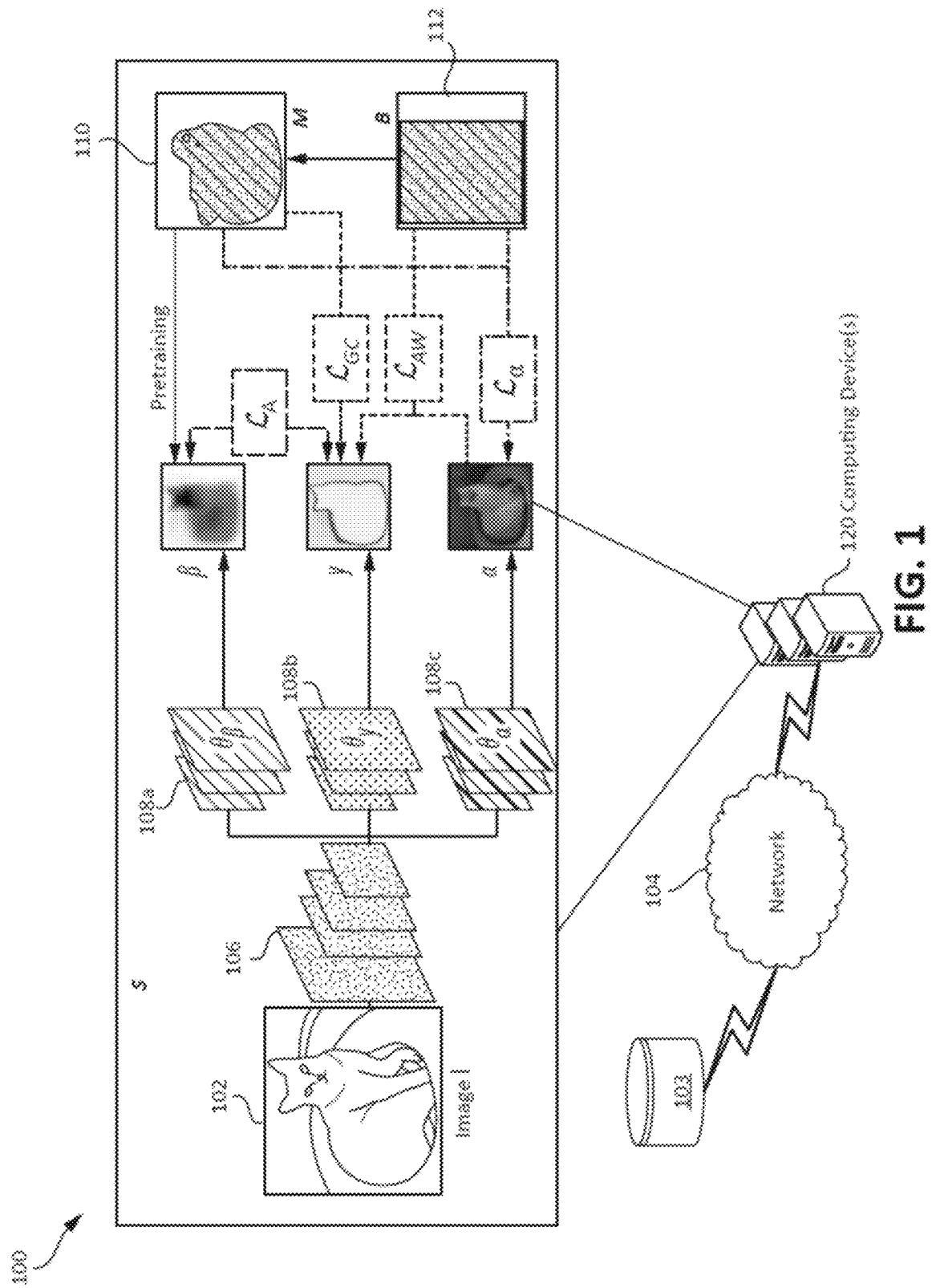
FIG. 1 is a diagram of an example system configured to perform segmentation using attention-weighted loss and discriminative feature learning, according to various embodiments of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Described herein are various approaches to semantic segmentation. In one embodiment, a weakly-supervised semantic segmentation approach is described that uses bounding box annotations for segmenting image data (e.g., segmenting objects from background image data). In such an embodiment, bounding boxes may be treated as noisy labels for foreground objects appearing in the image data. In various examples, a per-class attention map may be predicted to saliently guide the per-pixel cross-entropy loss to focus on foreground pixels and to refine coarse segmentation boundaries. Such techniques may avoid propagating erroneous gradients due to incorrect foreground labels on background image data.

Additionally, in some embodiments, pixel embeddings may be learned to simultaneously optimize for high intra-class feature affinity while increasing discrimination between features across different classes. In various examples, the embodiments described herein may achieve state-of-the-art (or better) segmentation accuracy on the PASCAL VOC 2012 dataset by significantly improving the mean Intersection-over-Union (mIoU) metric relative to previous weakly-supervised approaches. The terminology "weakly supervised," as used herein, refers to any segmentation machine learning methodologies trained using image data where pixel-level annotation is at least partially unavailable. For example, learning by segmentation models trained using image data annotated at the bounding box level and/or at the image level may be described as "weakly supervised." By contrast, learning by segmentation models trained using image data with class levels provided at the pixel level may be described as "fully supervised" or merely "supervised." The term "learning" as used herein refers to updating of machine learning model parameters and/or hyperparameters in order to satisfy one or more provided constraints.

Annotation of image data with semantic labels at the pixel level is both time-consuming and expensive, and does not scale well to a large number of different classes of objects for segmentation. In various examples, per-pixel annotation of image data may take from 4-10 minutes per image (depending on the number of object classes). By contrast, bounding box-level annotation may be performed in approximately 7 seconds. Bounding box annotation may include drawing a box around objects of each segmentation class appearing in the image and labeling each box with a class label to distinguish from other classes. Accordingly, generating training datasets using bounding box-level annotation is much faster and much less expensive relative to per-pixel level annotation. However, in the past, segmentation performance for weakly-supervised segmentation architectures has not matched fully-supervised approaches. However, in various embodiments described herein, training using bounding-box level annotation may provide performance that is comparable to recent fully-supervised methods when fine-tuned with limited amount of pixel level annotations.

The accuracy of semantic segmentation approaches has improved significantly in recent years. For example, the mIoU metric on the PASCAL VOC semantic segmentation benchmark has improved by over 20% in the last five years. The success of these efforts can be broadly attributed to (i) advancements in deep neural network architectures and loss functions, (ii) efficient processing (e.g., better graphical processing units (GPUs)), and (iii) the availability of large datasets of images with human-labeled per-pixel annotations. Improvements in network architectures and hardware capabilities benefit all deep learning tasks. However, as described above, large datasets with per-pixel semantic labels are both expensive and slow to obtain (typically 4-10 minutes per image), making it challenging to scale to a large number of object categories. Consequently, even the largest current semantic segmentation datasets include less than a couple of hundred object categories.

Some previous works have used synthetic datasets to address the scarcity of labeled data. While labeling synthetically-generated datasets involves little annotation effort, models trained on them do not always generalize well to real world image data due to the domain gap between the real and the synthetic images. Described herein are segmentation techniques that leverage real images (e.g., natural non-synthetic images) with weak supervision to improve semantic segmentation performance, particularly in the weakly-supervised learning context.

Bounding box annotations yield high quality ground truth at a small cost. As described above, per-pixel labeling may take over 4 minutes per image compared to ~7 seconds (35× faster) for per-image annotation of bounding boxes. Additionally, large datasets with bounding box-level annotations containing over 9 million images are currently publicly available. Weakly-supervised approaches using bounding box-level annotations have shown to be more accurate when compared to methods that use only image-level labels. Described herein are machine learning approaches that improve upon previous weakly-supervised semantic segmentation techniques.

In various embodiments described herein, bounding box-level annotations may be considered as including label noise for the foreground object. Since bounding box annotation is a super-set of the actual object segmentation (e.g., the bounding box surrounds pixels pertaining to the foreground object as well as some pixels pertaining to background image data), this label noise is one-sided. In other words, some foreground labels are incorrectly assigned to background pixels within the bounding box. However, all foreground pixels inside the bounding box and background pixels outside all bounding boxes are considered to be correctly labeled. Typical fully-supervised segmentation training considers the label for every pixel as correct and gradients are back-propagated from all pixels during model learning. However, back propagation of gradients for all pixels would be an issue for a weakly-supervised segmentation algorithm. To handle this, various embodiments described below predict a novel per-pixel class-specific attention map and pixel embeddings in addition to the per-pixel segmentation output. The attention map may be used to modulate the per-pixel cross-entropy loss to handle label noise and may reduce propagation of incorrect gradients (e.g., pixels within a bounding box labeled as foreground, but which are actually background). Thus, the attention map enables automatic discovery of salient regions of the object within the bounding box. In some embodiments, the attention map is regularized using a soft filling-rate constraint.

In some embodiments described herein, discriminative feature embeddings are learned in order to capture long-range pairwise relationships between pixels across an image. In various embodiments, these pair-wise pixel embeddings are pre-trained to maximize the affinity between pixels belonging to same classes, while at the same time increasing the distance between features corresponding to different classes. During training, a novel loss function is used on pairs of pixels such that the loss function encourages the pixel affinities to align with the predicted segmentation probabilities (e.g., the respective segmentation probability for each pixel in the pair). In various embodiments, discriminative feature learning can be incorporated in weakly-supervised semantic segmentation. The affinity between pairs of pixels may be measured using an affinity score with pixels with pixel values that are more similar to one another having higher affinity scores. Accordingly, in the various embodiments described herein, each sampled pixel pair may be associated with a respective affinity score.

FIG. 1 is a diagram of an example system 100 configured to perform segmentation using attention-weighted loss and discriminative feature learning, according to various embodiments of the present disclosure. As depicted in FIG. 1, computing device(s) 120 may include a non-transitory computer-readable memory 103 and/or may be configured in communication with non-transitory computer-readable memory 103, such as over network 104. In various examples, network 104 may represent a local area network (LAN) and/or a wide area network (WAN) such as the internet.

Various semantic segmentation techniques are described below in reference to FIG. 1, in accordance with various aspects of the present disclosure. In particular, an example system architecture, including loss functions, are depicted and described that enable generation of per-image, class-specific attention maps and/or pixel embeddings of discriminative features.

Feed Forward Network Architecture

Let input image $I \in \mathbb{R}^{n \times 3}$ denote a 3-channel input color image (e.g., frame of image data 102) with n pixels. The segmentation model S may be a fully-Convolutional Neural Network (CNN) which takes I as input into a common encoder 106 and generates three outputs by three different decoders 108a, 108b, and 108c. Decoder 108b may output the segmentation output probabilities $y \in \mathbb{P}^{m \times (L+1)}$, $\mathbb{P} \in [0, 1]$. Decoder 108c may be a decoder network that outputs the attention map $\alpha \in \mathbb{P}^{m \times L}$. Decoder 108a may output the pixel embeddings $\beta \in \mathbb{R}^{m \times d}$. Here d denotes the size of the pixel embeddings and m denotes the spatial resolution of the outputs. Each pixel in the output image can assume one of the L+1 pixel labels (e.g., L object categories and the background image data class). The ground truth bounding boxes (112) are denoted by $B_{box} \in \mathbb{R}^{K \times 5}$, where K is the number of bounding boxes comprising 4 coordinates and a class label. To simplify the notation, the box-segmentation tensor obtained by setting all pixels inside a bounding box to 1 is denoted by $B \in \mathbb{R}^{m \times (L+1)}$ (110) for the corresponding class label (channel). In the case where two bounding boxes overlap, 1 is assigned to the class corresponding to the smaller bounding box (assuming that the smaller box is in the front).

Pseudo ground-truth segmentation maps $M \in \mathbb{R}^{m \times (L+1)}$ (110) are generated by applying a graph-based unsupervised segmentation approach (e.g., Grabcut) on each bounding box in our training dataset. The segmentation masks obtained by classical methods, albeit noisy and imprecise, provide a good prior for training deep learning models. In various examples, graph cut segmentation techniques may apply graph theory to a frame of image data to achieve fast segmentation. The technique creates a graph of the image where each pixel is a node connected by weighted edges. The higher the probability that pixels are related the higher the weight of an edge. The algorithm cuts along weak edges, achieving the segmentation of objects in the image.

Training involves passing the input image I through the common encoder 106 (e.g., a common feature encoder) that feeds into the three branches of network S to produce y, α, and β, as follows:

$$y = \text{Softmax}(S(I, \theta_y)); \alpha = \sigma(S(I, \theta_\alpha)); \beta = S(I, \theta_\beta),$$

where $\theta_y$, $\theta_\alpha$, $\theta_\beta$ denote the parameters of the model S for the respective branches. Softmax denotes the softmax over all the classes and σ denotes the sigmoid activation function. Note that the segmentation output probabilities, y, sums up to 1 for each pixel across classes due to softmax. However, the activation maps, α, use sigmoid output, making them independent for each class.

Segmentation Baselines

The box-segmentation tensor B may be used to train a simple baseline by minimizing the following cross-entropy loss:

$$\mathcal{L}_{box} = -\frac{1}{m}\sum_{c=0}^{L}\sum_{i=1}^{m}B(i,c)\log(y(i,c)) \quad (1)$$

The GrabCut (or other graph-based segmentation outputs) outputs M obtained from the bounding boxes may be used to define another baseline by minimizing the following cross-entropy loss:

$$\mathcal{L}_{GC} = -\frac{1}{m}\sum_{c=0}^{L}\sum_{i=1}^{m}M(i,c)\log(y(i,c)) \quad (2)$$

In various examples, the GrabCut algorithm may provide reasonable segmentation outputs. Accordingly, the loss $L_{GC}$ may be used in addition to other loss functions described in the following sections.

Attention Weighted Segmentation Loss

The attention modulated cross-entropy loss $L_{AW}$ considers bounding box annotations as noisy labels for the foreground object. Note that since the bounding box is a superset of the actual object segmentation mask, the label noise is one-sided. That is to say, foreground labels may be incorrectly assigned to background pixels, but it may be assumed that no true foreground labels are missing. Additionally, pixels outside all the bounding boxes may be considered definite background without any label noise. Since supervised segmentation training typically considers all labels as correct, in the presence of label noise, erroneous gradients can be back propagated during training. At pixels close to bounding box and object boundaries, the network may receive conflicting information about the foreground/background labels at similar pixels. Accordingly, an attention map including the attention values α(i,c) may be used to modulate per-pixel cross-entropy loss.

Attention on Foreground Objects: The per-pixel cross-entropy loss may be modulated using the predicted attention map α output by decoder 108c by minimizing foreground loss:

$$\mathcal{L}_{fg} = \frac{-1}{\sum_{i}B(i,c)}\sum_{c=1}^{L}\sum_{i=1}^{m}\alpha(i,c)B(i,c)\log(y(i,c)) \quad (3)$$

Note that the attention map has same spatial resolution as the segmentation output y and is class-specific. The attention weighted loss is only defined for the L foreground classes. In addition, the loss is normalized with the size of the bounding box, to give similar weighting to each class.

Background Loss: Since the pixels outside all the bounding boxes can be considered as definite background, the background loss may be defined as:

$$\mathcal{L}_{bg} = -\frac{\sum_{i}^{m}B(i,0)\log(y(i,0))}{\sum_{i}^{m}B(i,0)} \quad (4)$$

where 0 denotes the background class. The Attention Weighted Loss (AWL) may be defined as:

$$L_{AW}=L_{fg}+L_{bg} \quad (5)$$

Attention Map Regularization: Without any regularization on the attention maps, the network can minimize $L_{fg}$ by predicting all α(i,c)=0. To prevent such a trivial solution, the attention map may be regularized. Two approaches for regularization are described below, although it should be appreciated that other regularization approaches may be employed in accordance with the semantic segmentation techniques described herein. The first example approach regularizes the attention mask using ground truth bounding boxes, by minimizing the $L_2$ loss between the attention maps and the bounding boxes.

$$\mathcal{L}_{\alpha}^{bbox} = \sum_{i=1}^{m}\sum_{c=1}^{L}\|B(i,c)-\alpha(i,c)\|^2 \quad (6)$$

The second example approach regularizes the attention mask using fill-ratios obtained from GrabCut output M (or other graph cut segmentation techniques), as follows. Let $\eta_c$ denote the per-class, per-image filling rate defined as the proportion of pixels in the pseudo ground-truth M compared to its corresponding bounding box.

$$\eta_c = \frac{\sum_{i}^{m}M(i,c)}{\sum_{i}^{m}B(i,c)} \quad (7)$$

Similarly, the predicted fill rate of the attention map is computed as:

$$\eta'_c = \frac{\sum_{i}^{m}B(i,c)\alpha(i,c)}{\sum_{i}^{m}B(i,c)} \quad (8)$$

Figure 2:
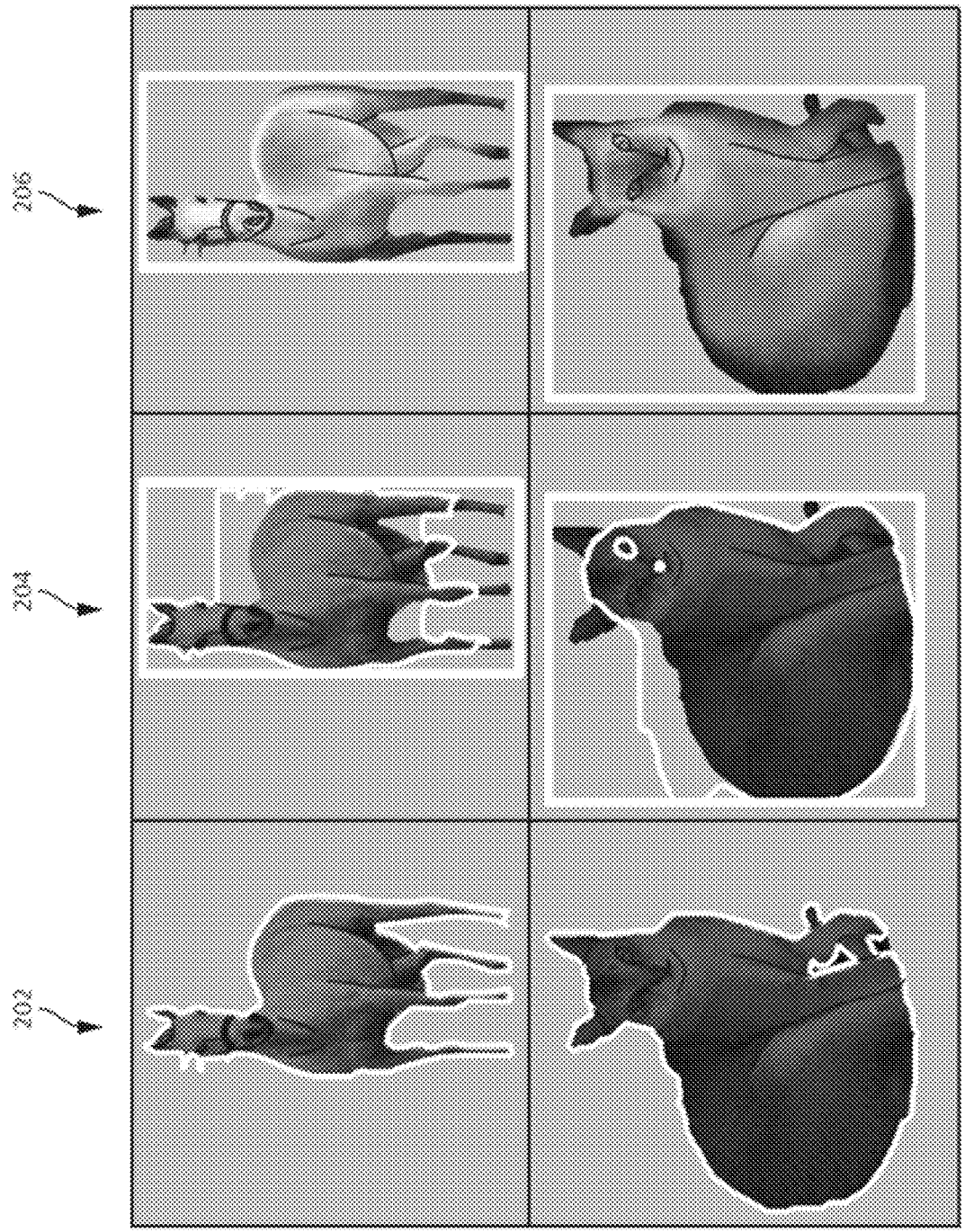
FIG. 2 depicts ground truth segmentation maps, graph-based segmentation maps including segmentation errors, and attention maps for two images, in accordance with various embodiments of the present disclosure.

A margin loss may be used to ensure that the predicted fill rate is at least a factor γ of the fill rate obtained using M.

$$L_{\alpha}^{fr}=\max(0,\gamma\eta_c-\eta'_c) \quad (9)$$

where γ∈[0,1] is a hyper-parameter (e.g., which may be set to 0.6, 0.55, 0.7, 0.8, or any value suitable for the particular implementation). Thus, the predicted fill rate may be allowed to vary between $\gamma\eta_c$ and 1. Equation 9 may enforce a soft constraint that the attention map should allow propagation of loss from at least γ% of $\eta_c$ pixels inside the bounding box. Using $L_\alpha^{bbox}$ for regularization forces the attention mask to take the shape of the bounding box. Thus, it is prone to include background pixels in the attention map. Using $L_\alpha^{fr}$ may provide a softer constraint that may provide better results. FIG. 2 depicts three qualitative examples where the attention map is able to focus on foreground pixels despite errors in the underlying GrabCut segmentations, allowing the semantic segmentation techniques described herein to be robust to label noise. Column 202 depicts input image data overlaid with ground truth masks (e.g., the outlines surrounding the horse and the cat segment the horse and the cat from the background). Column 204 represents the GrabCut segmentation including errors. Column 206 represents the predicted attention map generated by decoder 108c.

Discriminative Feature Learning

Pixel embeddings β may be learned in order to capture pairwise relationships between different pixels. Pixel embeddings are denoted as $\beta=\{\beta_i\}$, where $\beta_i$ is the d-dimensional feature for the $i^{th}$ pixel. Affinity between embeddings at pixel i and j is given by its normalized dot product:

$$\mathbb{A}(i, j) = \beta_i \cdot \beta_j = \frac{\beta_j^T \beta_i}{\|\beta_j\| \|\beta_i\|} \quad (10)$$

Intuitively, the training goal is to achieve high affinity between feature vectors of two pixels that belong to the same class, while ensuring low affinity between features of two different classes. Similarly, a background pixel should have low affinity with respect to another pixel that belongs to one of the L foreground classes. To achieve this result, the following loss function may be used on pairs of pixels (i,j), such that it encourages the pixel affinities to align with the predicted segmentation probabilities (e.g., by minimizing a difference between the affinity score for the pair of pixels and the product of the segmentation probabilities of the two pixels).

$$L\mathbb{A} = \Sigma_{i,j} (\mathbb{A}(i,j) - y_j^T y_i)^2 \quad (11)$$

Figure 3:
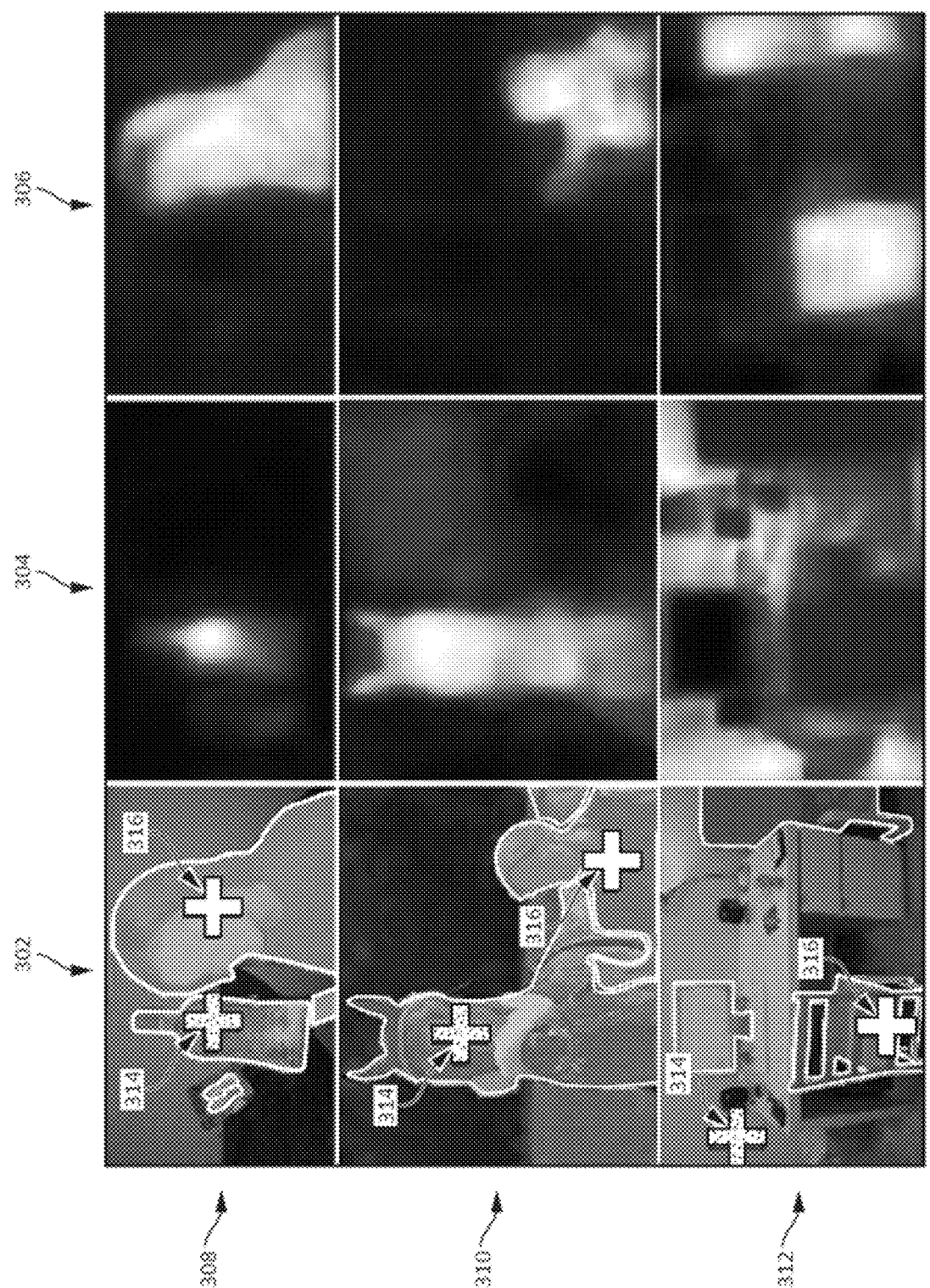
FIG. 3 depicts example affinity maps displaying a visualization of intra-class pixel affinity, in accordance with various aspects of the present disclosure.

However, training affinity matrices requires large amounts of memory. To avoid creating large affinity matrices of size m×m, a small fraction of pixel embeddings may be randomly sampled equally from each class to compute the loss in equation 11. An example of the affinity maps computed from such class-discriminative embeddings is shown in FIG. 3.

In column 302, input images 308, 310, and 312 are depicted with overlaid ground truth segmentation masks (e.g., with per-pixel borders around foreground objects). Pixels 314 and 316 are marked with plus signs ("+") in FIG. 3. Column 304 displays affinity heat maps with respect to pixel 314 while column 306 displays affinity heat maps with respect to pixel 316.

Overall Network Architecture

Accordingly, in various embodiments, the following combined loss function may be optimized:

$$L = L_{GC} + \lambda_{Aw} L_{Aw} + \lambda_\alpha L_\alpha + \lambda \mathbb{A} L \mathbb{A} \quad (12)$$

where $L_\alpha$ equals either $L_\alpha^{bbox}$ or $L_\alpha^{fr}$. $\lambda_{AW}$, $\lambda_\alpha$ and $\lambda \mathbb{A}$ may be weights applied to the individual losses.

Image segmentation may be widely applicable in a number of different technological areas. For example, autonomous vehicles may be required to recognize and/or distinguish between different types of objects while driving. Additionally, semantic segmentation has numerous applications in photo-editing, such as adding Bokeh effect, blurring of background image data, filtering, and various other tasks. In some further examples, semantic segmentation may be used to understand scene depth in augmented and/or virtual reality environments. The techniques described herein may allow for weakly-supervised learning of segmentation models that perform as well or better than current fully-supervised segmentation models. Additionally, the techniques described herein may be useful when developing annotated training data sets, as bounding box-level annotation may be quicker and less expensive to generate relative to per-pixel annotation. Additionally, the techniques described herein may be used in conjunction with per-pixel level annotated data to train and improve performance of segmentation models.

Figure 4:
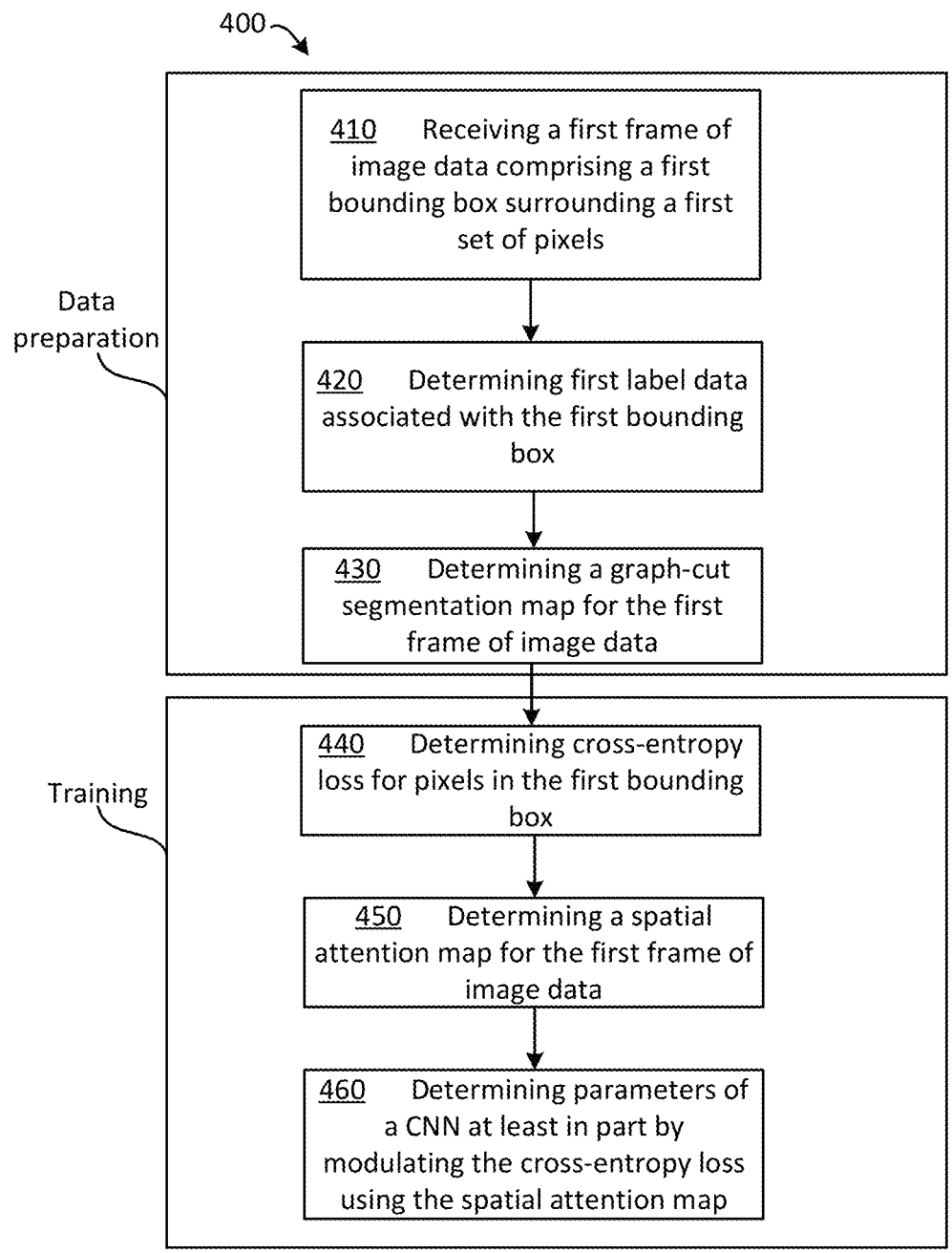
FIG. 4 depicts a flow chart showing an example process for training a semantic segmentation network, in accordance with various aspects of the present disclosure.

FIG. 4 depicts a flow chart showing an example process 400 for training a semantic segmentation network, in accordance with various aspects of the present disclosure. Those portions of FIG. 4 that have been previously discussed in reference to FIGS. 1-3 may not be described again for purposes of clarity and brevity. The actions of the process 400 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 400 of FIG. 4 may begin at action 410, "Receiving a first frame of image data comprising a first bounding box surrounding a first set of pixels." At action 410, a first frame of image data (e.g., image data 102) may be received. The image data may be annotated with one or more bounding boxes surrounding one or more objects for segmentation within the image data. The bounding boxes may surround all pixels of a particular object associated with a class for which the segmentation network is being trained to designate as foreground. Additionally, the bounding box may be "noisy" as the bounding box may include one or more pixels that are either of a different class of object or are associated with background image data.

Processing may continue from action 410 to action 420, "Determining first label data associated with the first bounding box." At action 420, first label data may be associated with the first bounding box. For example, the first label data may be data used to identify a class of the object bounded by the bounding box. In the example of FIG. 1, the label data may identify the class "cat."

Processing may continue from action 420 to action 430, "Determining a graph-cut segmentation map for the first frame of image data." At action 430, a graph-cut segmentation technique (e.g., GrabCut) may be used to generate a baseline segmentation mask. For example, the graph-cut segmentation mask may be used to generate a per-pixel cross-entropy loss that may refine between pixels representing the object in the bounding box and pixels that do not represent the object. In various examples, actions 410, 420, and 430 may be considered as dataset preparation prior to training one or more machine learning models of system 100.

Processing may continue from action 430 to action 440, "Determining cross-entropy loss for pixels in the first bounding box." At action 440, the graph-cut segmentation mask and the first frame of image data including the bounding box may be used to determine a per-pixel cross-entropy loss. In various examples, the cross-entropy loss may be minimized by comparing a predicted output of the model S with the pixel's label in the first frame of image data and/or with the graph-cut segmentation mask.

Processing may continue from action 440 to action 450, "Determining a spatial attention map for the first frame of image data." Decoder 108c may be trained to generate a spatial attention map for the input image data using the predicted segmentation output and the noisy foreground image data in the input image data.

Processing may continue from action 450 to action 460, "Determining parameters of a CNN by modulating the cross-entropy loss using the spatial attention map." At action 460 the cross-entropy loss may be modulated using the attention map (see equations 3-5 above) such that loss for pixels associated with highly-confident segmentation predictions (e.g., feature predictions) are weighted more heavily. In various examples, actions 440, 450, and/or 460 may be performed during training of the one or more machine learning models of system 100.

Figure 5:
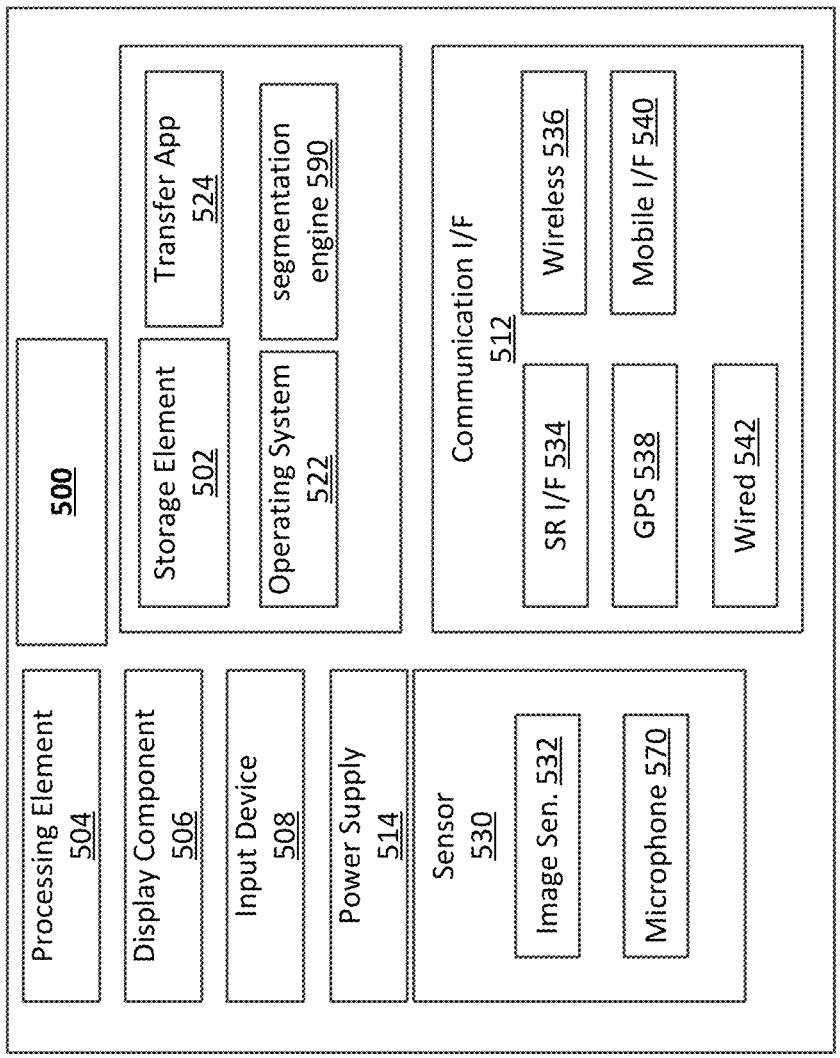
FIG. 5 is a block diagrams showing an example architecture of a computing device that may be used in accordance with various embodiments described herein.

FIG. 5 is a block diagram showing an example architecture 500 of a computing device that may be used to perform semantic segmentation, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store segmentation masks, parameters, and/or machine learning models generated using the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

A segmentation engine 590 may be effective to perform one or more the segmentation and/or training techniques described herein, such as one or more techniques described above in reference to FIG. 1. For example, segmentation engine 590 may implement one or more CNNs that may be used to extract semantic feature data from input image data. Additionally, segmentation engine 590 may be effective to generate attention maps, determine cross-entropy loss, and/or modulate cross-entropy loss using the attention maps. Further, segmentation engine 590 may learn discriminative features using pixel affinity, as described above.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display input images and/or segmentation masks generated in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing device(s) 120, as described herein, are exemplary, and may be located as a stand-alone device or may be included, in whole or in part, as a component of a larger device or system.

Figure 6:
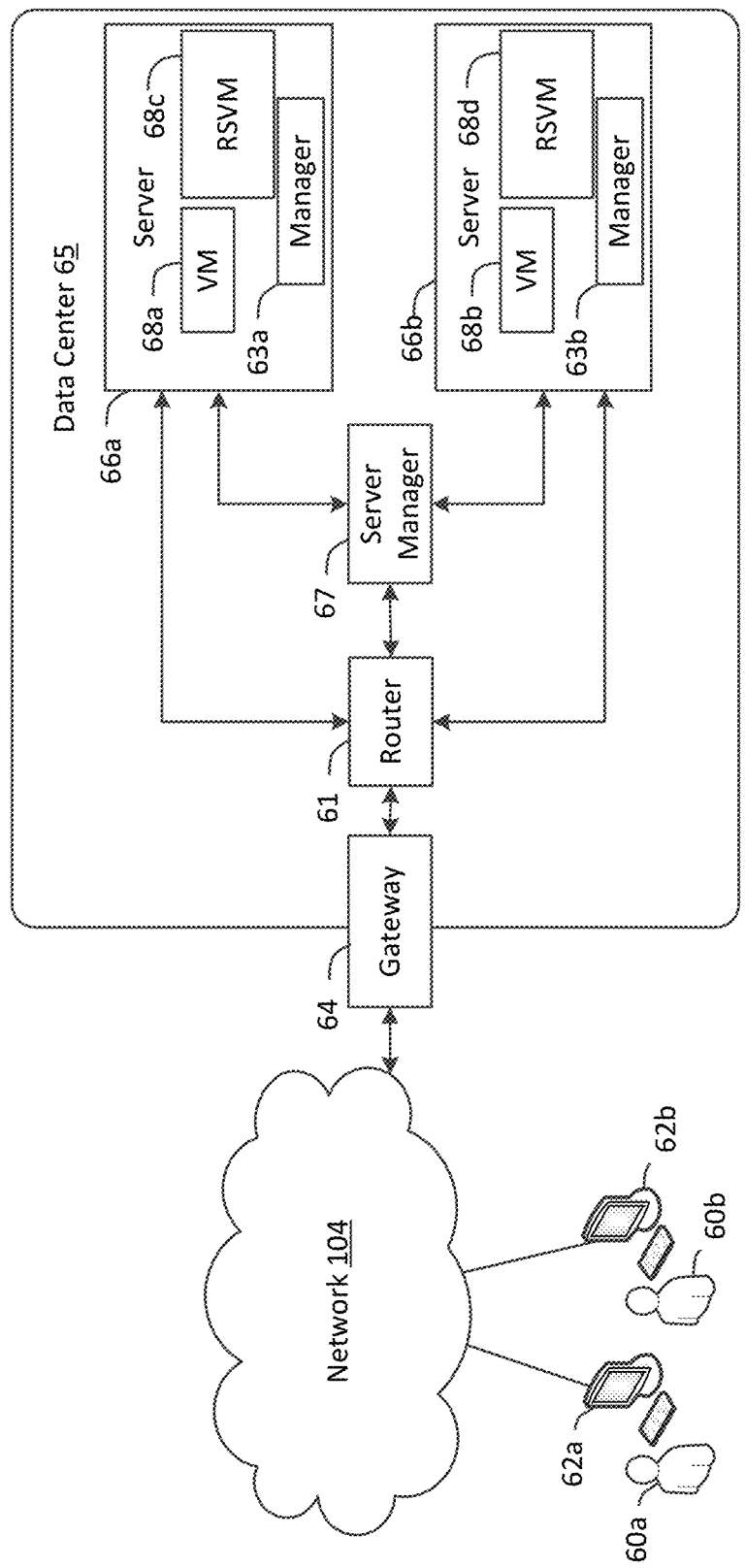
FIG. 6 is a diagram illustrating an example system for sending and providing data that may be used in accordance with the present disclosure.

An example system for sending and providing data and generation of synthetic data for computer vision object detection models will now be described in detail. In particular, FIG. 6 illustrates an example computing environment in which the embodiments described herein may be implemented. For example, the computing environment of FIG. 6 may be used to provide segmentation as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various segmentation techniques described herein.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of segmenting objects in image data, the method comprising:
   receiving a first frame of image data comprising a first bounding box surrounding a first set of pixels, wherein a first subset of pixels of the first set of pixels represent a first object of a first class and wherein a second subset of pixels of the first set of pixels represent background image data;
   determining first label data associated with the first bounding box, the first label data corresponding to the first class;
   determining a first segmentation map from the first frame of image data using a graph cut segmentation technique;
   determining cross-entropy loss for the first set of pixels;
   determining a spatial attention map for the first frame of image data using the first segmentation map;
   determining parameters of a convolutional neural network based at least in part on modulating the cross-entropy loss for the first set of pixels using the spatial attention map; and
   generating, by the convolutional neural network, a second segmentation map comprising the first label data associated with the first subset of pixels and second label data associated with the second subset of pixels, wherein the second label data corresponds to the background image data.

2. The method of claim 1, further comprising:
   for each of a plurality of pairs of pixels among the first set of pixels, determining a corresponding affinity score, wherein a first pixel pair comprising a first pixel selected from the first subset of pixels and a second pixel selected from the first subset of pixels has a higher affinity score relative to a second pair of pixels comprising a third pixel selected from the second subset of pixels and a fourth pixel selected from the first subset of pixels; and
   wherein determining the parameters of the convolutional neural network is further based at least in part on minimizing a loss between the affinity score for the first pixel pair and a predicted segmentation probability for the first pixel pair, wherein the predicted segmentation probability is determined from the first segmentation map.

3. The method of claim 1, further comprising:
   determining an attention weighted loss function comprising a predicted foreground loss for the first set of pixels and a predicted background loss of the second subset of pixels; and
   wherein determining the parameters of the convolutional neural network is further based at least in part on minimizing the attention weighted loss function.

4. A method of segmenting image data, comprising:
   receiving a first frame of image data comprising a first bounding box surrounding a first set of pixels, wherein a first subset of pixels of the first set of pixels represent a first object of a first class and wherein a second subset of pixels of the first set of pixels represent background image data;
   determining cross-entropy loss for the first set of pixels;
   determining a spatial attention map that is associated with the first class for the first set of pixels;
   determining parameters of a convolutional neural network based at least in part on modulating the cross-entropy loss for the first set of pixels using the spatial attention map; and
   generating, by the convolutional neural network, a first segmentation map comprising first label data associated with the first subset of pixels and second label data associated with the second subset of pixels, wherein the first label data identifies the first class and the second label data identifies the background image data.

5. The method of claim 4, further comprising:
   generating a second segmentation map from the first frame of image data using graph cut segmentation; and
   minimizing the cross-entropy loss for the first set of pixels based at least in part on pixel labels from the second segmentation map.

6. The method of claim 4, further comprising:
   generating the spatial attention map by a decoder network trained to generate the spatial attention map; and
   wherein determining the parameters of the convolutional neural network is further based at least in part on minimizing a loss defined at least in part by a product of an attention value of the spatial attention map and the cross-entropy loss for a given pixel of the first set of pixels.

7. The method of claim 6, further comprising using a fill rate of the spatial attention map to prevent the attention value from becoming zero.

8. The method of claim 4, further comprising:
   determining a first feature vector representing a first pixel of the first subset of pixels;
   determining a second feature vector representing a second pixel of the first subset of pixels; and
   determining an affinity score for the first pixel and the second pixel using the first feature vector and the second feature vector.

9. The method of claim 8, further comprising:
   determining a first segmentation probability for the first pixel;
   determining a second segmentation probability for the second pixel; and
   wherein determining the parameters of the convolutional neural network is further based at least in part on minimizing a difference between the affinity score and a product of the first segmentation probability and the second segmentation probability.

10. The method of claim 4, further comprising:
    determining a pixel affinity for a pair of pixels in the first set of pixels;
    determining a first segmentation probability and a second segmentation probability for the pair of pixels; and
    wherein determining the parameters of the convolutional neural network is further based at least in part on minimizing a difference between the pixel affinity and a product of the first segmentation probability and the second segmentation probability.

11. The method of claim 4, further comprising:
    receiving training data comprising bounding box-level annotation;
    generating a second segmentation map from the first frame of image data using graph cut segmentation; and updating the convolutional neural network using the training data and the second segmentation map.

12. The method of claim 4, further comprising determining, for a first pixel of the first frame of image data, a set of probabilities using the convolutional neural network, wherein each probability of the set of probabilities represents a corresponding probability that the first pixel belongs to a respective class of objects.

13. A system comprising:
at least one processor; and
at least one non-transitory computer-readable memory storing instructions that, when executed by the at least one processor, are effective to program the processor to:
  receive a first frame of image data comprising a first bounding box surrounding a first set of pixels, wherein a first subset of pixels of the first set of pixels represent a first object of a first class and wherein a second subset of pixels of the first set of pixels represent background image data;
  determine cross-entropy loss for the first set of pixels;
  determine a spatial attention map that is associated with the first class for the first set of pixels;
  determine parameters of a convolutional neural network based at least in part on modulating the cross-entropy loss for the first set of pixels using the spatial attention map; and
  generate, by the convolutional neural network, a first segmentation map comprising first label data associated with the first subset of pixels and second label data associated with the second subset of pixels, wherein the first label data identifies the first class and the second label data identifies the background image data.

14. The system of claim 13, the at least one non-transitory computer-readable memory storing further instructions that, when executed by the at least one processor, are further effective to program the at least one processor to:
  generate a second segmentation map from the first frame of image data using graph cut segmentation; and
  minimize the cross-entropy loss for the first set of pixels based at least in part on pixel labels from the second segmentation map.

15. The system of claim 13, the at least one non-transitory computer-readable memory storing further instructions that, when executed by the at least one processor, are further effective to program the at least one processor to:
  generate the spatial attention map by a decoder network trained to generate the spatial attention map; and
  determine the parameters of the convolutional neural network further based at least in part on minimizing a loss defined at least in part by a product of an attention value of the spatial attention map and the cross-entropy loss for a given pixel of the first set of pixels.

16. The system of claim 15, the at least one non-transitory computer-readable memory storing further instructions that, when executed by the at least one processor, are further effective to program the at least one processor to use a fill rate of the spatial attention map to prevent the attention value from becoming zero.

17. The system of claim 13, the at least one non-transitory computer-readable memory storing further instructions that, when executed by the at least one processor, are further effective to program the at least one processor to:
  determine a first feature vector representing a first pixel of the first subset of pixels;
  determine a second feature vector representing a second pixel of the first subset of pixels; and
  determine an affinity score for the first pixel and the second pixel using the first feature vector and the second feature vector.

18. The system of claim 17, the at least one non-transitory computer-readable memory storing further instructions that, when executed by the at least one processor, are further effective to program the at least one processor to:
  determine a first segmentation probability for the first pixel;
  determine a second segmentation probability for the second pixel; and
  determine the parameters of the convolutional neural network further based at least in part on minimizing a difference between the affinity score and a product of the first segmentation probability and the second segmentation probability.

19. The system of claim 13, the at least one non-transitory computer-readable memory storing further instructions that, when executed by the at least one processor, are further effective to program the at least one processor to:
  determine a pixel affinity for a pair of pixels in the first set of pixels;
  determine a first segmentation probability and a second segmentation probability for the pair of pixels; and
  determine the parameters of the convolutional neural network further based at least in part on minimizing a difference between the pixel affinity and a product of the first segmentation probability and the second segmentation probability.

20. The system of claim 13, the at least one non-transitory computer-readable memory storing further instructions that, when executed by the at least one processor, are further effective to program the at least one processor to:
  receive training data comprising bounding box-level annotation;
  generate a second segmentation map from the first frame of image data using graph cut segmentation; and
  update the convolutional neural network using the training data and the second segmentation map.

* * * * *